United States Patent
Dimitrova

(10) Patent No.: US 6,363,380 B1
(45) Date of Patent: Mar. 26, 2002

(54) MULTIMEDIA COMPUTER SYSTEM WITH STORY SEGMENTATION CAPABILITY AND OPERATING PROGRAM THEREFOR INCLUDING FINITE AUTOMATION VIDEO PARSER

(75) Inventor: Nevenka Dimitrova, Yorktown Heights, NY (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/006,657

(22) Filed: Jan. 13, 1998

(51) Int. Cl.$^7$ .............................................. G06F 17/30
(52) U.S. Cl. .................................. 707/6; 707/4; 707/5
(58) Field of Search ........................................ 707/4–6

(56) References Cited

U.S. PATENT DOCUMENTS

| | | | |
|---|---|---|---|
| 5,343,554 A | * 8/1994 | Koza et al. ................... 706/13 |
| 5,500,920 A | * 3/1996 | Kupiec ..................... 704/270.1 |
| 5,504,896 A | * 4/1996 | Schell et al. ................. 725/131 |
| 5,628,003 A | * 5/1997 | Fujisawa et al. ............. 707/103 |
| 5,907,837 A | * 5/1999 | Ferrel et al. .................... 707/3 |
| 5,926,823 A | * 7/1999 | Okumura et al. ........... 707/514 |
| 5,950,184 A | * 8/1999 | Karttunen .................... 707/100 |
| 5,995,963 A | * 11/1999 | Nanba et al. ................... 707/6 |
| 6,108,676 A | * 8/2000 | Nakaatsuyame ............ 707/522 |
| 6,172,675 B1 | * 1/2001 | Ahmad et al. .............. 345/328 |
| 6,198,906 B1 | * 3/2001 | Boetje et al. ................ 455/3.1 |

FOREIGN PATENT DOCUMENTS

| WO | WO9612239 | 4/1996 | ........... G06F/17/30 |

* cited by examiner

Primary Examiner—Wayne Amsbury

(57) ABSTRACT

A story segment retrieval device for a multimedia computer system storing a multimedia signal including a video signal, an associated audio signal and text information as a plurality of individually retrievable story segments, each having associated therewith a finite automaton (FA) model and keywords, at least one of which is associated with each respective node of the FA model. Advantageously, the story segment retrieval device includes a device for selecting a class of FA models corresponding to a desired story segment to thereby generate a selected FA model class, a device for selecting a subclass of the selected FA model class corresponding to the desired story segment to thereby generate a selected FA model subclass, a device for generating a plurality of keywords corresponding to the desired story segment, a device for sorting a set of the story segments corresponding to the selected FA model subclass using selected keyframes, keywords and query video clips to retrieve ones of the set of the story segments including the desired story segment. Multimedia signal parsing, video story segmentation, and video story categorization methods and corresponding systems, as well as storage media storing computer-readable instructions for performing these methods, are also described.

19 Claims, 9 Drawing Sheets

MULTIMEDIA COMPUTER SYSTEM WITH STORY SEGMENTATION CAPABILITY AND OPERATING PROGRAM THEREFOR INCLUDING FINITE AUTOMATION VIDEO PARSER

BACKGROUND OF THE INVENTION

The present invention relates generally to multimedia systems, including hybrid television-computer systems. More specifically, the present invention relates to story segmentation systems and corresponding processing software for separating an input video signal into discrete story segments. Advantageously, the multimedia system implements a finite automaton parser for video story segmentation.

Popular literature is replete with images of personal information systems where the user can merely input several keywords and the system will save any news broadcast, either radio or television broadcast, for later playback. To date, only computer systems running news retrieval software have come anywhere close to realizing the dream of a personal news retrieval system. In these systems, which generally run dedicated software, and may require specialized hardware, the computer monitors an information source and downloads articles of interest. For example, several programs can be used to monitor the Internet and download articles of interest in background for later replay by the user. Although these articles may include links to audio or video clips which can be downloaded while the article is being examined, the articles are selected based on keywords in the text. However, many sources of information, e.g., broadcast and cable television signals, cannot be retrieved in this manner.

The first hurdle which must be overcome in producing a multimedia computer system and corresponding operating method capable of video story segmentation is in designing a software or hardware system capable of parsing an incoming video signal, where the term video signal denotes, e.g., a broadcast television signal including video shots and corresponding audio segments. For example, U.S. Pat. No. 5,635,982 discloses an automatic video content parser for parsing video shots so that they can be represented in their native media and retrieved based on their visual content. Moreover, this patent discloses methods for temporal segmentation of video sequences into individual camera shots using a twin-comparison method, which method is capable of detecting both camera shots implemented by sharp break and gradual transitions implemented by special editing techniques, including dissolve, wipe, fade-in and fade-out; and content-based keyframe selection of individual shots by analyzing the temporal variation of video content and selecting a key frame once the difference of content between the current frame and a preceding selected keyframe exceeds a set of preselected thresholds. The patent admits that such parsing is a necessary first step in any video indexing process. However, while the automatic video parser is capable of parsing a received video stream into a number of separate video shots, i.e., cut detection, the automatic video processor is incapable of video indexing the incoming video signal based on the parsed video segments, i.e., content parsing.

While there has been significant previous research in parsing and interpreting spoken and written natural languages, e.g., English, French, etc., the advent of new interactive devices has motivated the extension of traditional lines of research. There has been significant investigation into processing isolated media, especially speech and natural language and, to a lesser degree, handwriting. Other research has focused on parsing equations (e.g., a handwritten "5+3"), drawings (e.g., flow charts), and even face recognition, e.g., lip, eye, and head movements. While parsing and analyzing multimedia presents an even greater challenges with a potentially commensurate reward, the literature is only now suggesting the analysis of multiple types of media for the purpose of resolving ambiguities in one of the media types. For example, the addition of a visual channel to a speech recognizer could provide further visual information, e.g., lip movements, and body posture, which could be used to help in resolving ambiguous speech. However, these investigations have not considered using the output of, for example, a language parser to identify keywords which can be associated with video segments to further identify these video segments.

The article by Deborah Swanberg eta al. entitled "Knowledge Guided Parsing in Video Databases" summarized the problem as follows:

"Visual information systems require both database and vision system capabilities, but a gap exists between these two systems: databases do not provide image segmentation, and vision systems do not provide database query capabilities . . . The data acquisition in typical alphanumeric databases relies primarily on the user to type in the data. Similarly, past visual databases have provided keyword descriptions of the visual descriptions of the visual data, so data entry did not vary much from the original alphanumeric systems. In many cases, however, these old visual systems did not provide a sufficient description of the content of the data."

The paper proposed a new set of tools which could be used to: semiautomatically segment the video data into domain objects; process the video segments to extract features from the video frames; represent desired domains as models; and compare the extracted features and domain objects with the representative models. The article suggests the representation of episodes with finite automatons, where the alphabet consists of the possible shots making up the continuous video stream and where the states contain a list arcs, i.e., a pointer to a shot model and a pointer to the next state.

In contrast, the article by M. Yeung et al., entitled "Video Content Characterization and Compaction for Digital Library Applications" describes content characterization by a two step process of labeling, i.e., assigning shots that are visually similar and temporally close to each other the same label, and model identification in terms of the resulting label sequence. Three fundamental models are proposed: dialogues, action; and story unit models. Each of these models has a corresponding recognition algorithm.

The second hurdle which must be overcome in producing a multimedia computer system and corresponding operating method capable of video story segmentation is in integrating other software, including text parsing and analysis software and voice recognition software, into a software and/or hardware system capable of content analysis of any audio and text, e.g., closed captions, in an incoming multimedia signal, e.g., a broadcast video signal. The final hurdle which must be overcome in producing a multimedia computer system and corresponding operating method capable of story segmentation is in designing a software or hardware system capable integrating the outputs of the various parsing modules or devices into a structure permitting replay of only the story segments in the incoming video signal which are of interest to the user.

What is needed is a multimedia system and corresponding operating program for story segmentation based on plural portions of a multimedia signal, e.g., a broadcast video signal. Moreover, what is needed is an improved multimedia signal parser which either effectively matches story segment patterns with predefined story patterns or which generates a new story pattern in the event that a match cannot be found. Furthermore, a multimedia computer system and corresponding operating program which can extract usable information from all of the included information types, e.g., video, audio, and text, included in a multimedia signal would be extremely desirable, particularly when the multimedia source is a broadcast television signal, irrespective of its transmission method.

SUMMARY OF THE INVENTION

Based on the above and foregoing, it can be appreciated that there presently exists a need in the art for a multimedia computer system and corresponding operating method which overcomes the above-described deficiencies. The present invention was motivated by a desire to overcome the drawbacks and shortcomings of the presently available technology, and thereby fulfill this need in the art.

The present invention is a multimedia computer system and corresponding operating method capable of performing video story segmentation on an incoming multimedia signal. According to one aspect of the present invention, the video segmentation method advantageously can be performed automatically or under direct control of the user.

One object of the present invention is to provide a multimedia computer system for processing and retrieving video information of interest based on information extracted from video signals, audio signals, and text constituting a multimedia signal.

Another object according to the present invention is to produce a method for analyzing and processing multimedia signals for later recovery. Preferably, the method generates a finite automaton (FA) modeling the format of the received multimedia signal. Advantageously, key words extracted from a closed caption insert are associated with each node of the FA. Moreover, the FA can be expanded to include nodes representing music and conversation.

Still another object according to the present invention is to provide a method for recovering a multimedia signal selected by the user based on the FA class and FA characteristics.

Yet another object according to the present invention is to provide a storage media for storing program modules for converting a general purpose multimedia computer system into a specialized multimedia computer system for processing and recovering multimedia signals in accordance with finite automatons. The storage media advantageously can be a memory device such as a magnetic storage device, an optical storage device or a magneto-optical storage device.

These and other objects, features and advantages according to the present invention are provided by a storage medium for storing computer readable instructions for permitting a multimedia computer system receiving a multimedia signal containing unknown information, the multimedia signal including a video signal, an audio signal and text, to perform a parsing process on the multimedia signal to thereby generate a finite automaton (FA) model and to one of store and discard an identifier associated with the FA model based on agreement between user-selected keywords and keywords associated with each node of the FA model extracted by the parsing process. According to one aspect of the invention, the storage medium comprises a rewrittable compact disc (CD-RW) and wherein the multimedia signal is a broadcast television signal.

These and other objects, features and advantages according to the present invention are provided by a storage medium for storing computer readable instructions for permitting a multimedia computer system to retrieve a selected multimedia signal from a plurality of stored multimedia signals by identifying a finite automaton (FA) model having a substantial similarity to the selected multimedia signal and by comparing FA characteristics associated with the nodes of the FA model with user-specified characteristics. According to one aspect of the present invention, the storage medium comprises a hard disk drive while the multimedia signals are stored on a digital versatile disc (DVD).

These and other objects, features and advantages according to the present invention are provided by a multimedia signal parsing method for operating a multimedia computer system receiving a multimedia signal including a video shot sequence, an audio signal and text information to permit story segmentation of the multimedia signal into discrete stories, each of which has associated therewith a final finite automaton (FA) model and keywords, at least one of which is associated with a respective node of the FA model. Preferably, the method includes steps for:

(a) analyzing the video portion of the received multimedia signal to identify keyframes therein to thereby generate identified keyframes;

(b) comparing the identified keyframes within the video shot sequence with predetermined FA characteristics to identify a pattern of appearance within the video shot sequence;

(c) constructing a finite automaton (FA) model describing the appearance of the video shot sequence to thereby generate a constructed FA model;

(d) coupling neighboring video shots or similar shots with the identified keyframes when the neighboring video shots are apparently related to a story represented by the identified keyframes;

(e) extracting the keywords from the text information and storing the keywords at locations associated with each node of the constructed FA model;

(f) analyzing and segmenting the audio signal in the multimedia signal into identified speaker segments, music segments, and silent segments (g) attaching the identified speaker segments, music segments, laughter segments, and silent segments to the constructed FA model;

(h) when the constructed FA model matches a previously defined FA model, storing the identity of the constructed FA model as the final FA model along with the keywords; and (i) when the constructed FA model does not match a previously defined FA model, generating a new FA model corresponding to the constructed FA model, storing the new FA model, and storing the identity of the new FA model as the final FA model along with the keywords.

According to one aspect of the present invention, the method also included steps for (j) determining whether the keywords generated in step (e) match user-selected keywords; and (k) when a match is not detected, terminating the multimedia signal parsing method.

These and other objects, features and advantages according to the present invention are provided by a combination receiving a multimedia signal including a video shot sequence, an audio signal and text information for performing story segmentation on the multimedia signal to generate discrete stories, each of which has associated therewith a final finite automaton (FA) model and keywords, at least one of which is associated with a respective node of the FA model. Advantageously, the combination includes:

a first device for analyzing the video portion of the received multimedia signal to identify keyframes therein to thereby generate identified keyframes;

a second device for comparing the identified keyframes within the video shot sequence with predetermined FA characteristics to identify a pattern of appearance within the video shot sequence;

a third device constructing a finite automaton (FA) model describing the appearance of the video shot sequence to thereby generate a constructed FA model;

a fourth device for coupling neighboring video shots or similar shots with the identified keyframes when the neighboring video shots are apparently related to a story represented by the identified keyframes;

a fifth device for extracting the keywords from the text information and storing the keywords at locations associated with each node of the constructed FA model;

a sixth device for analyzing and segmenting the audio signal in the multimedia signal into identified speaker segments, music segments, and silent segments a seventh device for attaching the identified speaker segments, music segments, and silent segments to the constructed FA model;

an eighth device for storing the identity of the constructed FA model as the final FA model along with the keywords when the constructed FA model matches a previously defined FA model; and a ninth device for generating a new FA model corresponding to the constructed FA model, for storing the new FA model, and for storing the identity of the new FA model as the final FA model along with the keywords when the constructed FA model does not match a previously defined FA model.

These and other objects, features and advantages according to the present invention are provided by a method for operating a multimedia computer system storing a multimedia signal including a video signal, an audio signal and text information as a plurality of individually retrievable story segments, each having associated therewith a finite automaton (FA) model and keywords, at least one of which is associated with each respective node of the FA model, the method comprising steps for:

selecting a class of FA models corresponding to a desired story segment to thereby generate a selected FA model class;

selecting a subclass of the selected FA model class corresponding to the desired story segment to thereby generate a selected FA model subclass;

generating a plurality of keywords corresponding to the desired story segment;

sorting a set of the story segments corresponding to the selected FA model subclass using the keywords to retrieve ones of the set of the story segments including the desired story segment.

These and other objects, features and advantages according to the present invention are provided by a story segment retrieval device for a multimedia computer system storing a multimedia signal including a video signal, an audio signal and text information as a plurality of individually retrievable story segments, each having associated therewith a finite automaton (FA) model and keywords, at least one of which is associated with each respective node of the FA model. Advantageously, the device includes:

a device for selecting a class of FA models corresponding to a desired story segment to thereby generate a selected FA model class;

a device for selecting a subclass of the selected FA model class corresponding to the desired story segment to thereby generate a selected FA model subclass;

a device for generating a plurality of keywords corresponding to the desired story segment;

a device for sorting a set of the story segments corresponding to the selected FA model subclass using the keywords to retrieve ones of the set of the story segments including the desired story segment.

These and other objects, features and advantages according to the present invention are provided by a video story parsing method employed in the operation of a multimedia computer system receiving a multimedia signal including a video shot sequence, an associated audio signal and corresponding text information to permit a multimedia signal parsed into a predetermined category having an associated finite automaton (FA) model and keywords, at least one of the keywords being associated with a respective node of the FA model to be parsed into a number of discrete video stories. Advantageously, the method includes steps for extracting a plurality of keywords from an input first sentence, categorizing the first sentence into one of a plurality of categories, determining whether a current video shot belongs to a previous category, a current category or a new category of the plurality of categories responsive to similarity between the first sentence and an immediately preceding sentence, and repeating the above-mentioned steps until all video clips and respective sentences are assigned to one of the categories.

According to one aspect of the present invention, the categorizing step advantageously can be performed by categorizing the first sentence into one of a plurality of categories by determining a measure $M_k^i$ of the similarity between the keywords extracted during step (a) and a keyword set for an $i^{th}$ story category Ci according to the expression set:

$$M_k^i = \left(\frac{MK}{Nkeywords} + Mem^i\right)\Big/2$$

$$M_k^i = \frac{MK}{Nkeywords}$$

where MK denotes a number of matched words out of a total number Nkeywords of keywords in the respective keyword set for a characteristic sentence in the category Ci, where $Mem^i$ is indicative of a measure of similarity with respect to the previous sentence sequence within category Ci and wherein $0<M_k^i<1$.

Moreover, these and other objects, features and advantages according to the present invention are provided by a method for operating a multimedia computer system receiving a multimedia signal including a video shot sequence, an associated audio signal and corresponding text information to thereby generate a video story database including a plurality of discrete stories searchable by one of finite automaton (FA) model having associated keywords, at least one of which keywords is associated with a respective node of the FA model, and user selected similarity criteria. Preferably, the method includes steps for:

(a) analyzing the video portion of the received multimedia signal to identify keyframes therein to thereby generate identified keyframes;

(b) comparing the identified keyframes within the video shot sequence with predetermined FA characteristics to identify a pattern of appearance within the video shot sequence;

(c) constructing a finite automaton (FA) model describing the appearance of the video shot sequence to thereby generate a constructed FA model;

(d) coupling neighboring video shots or similar shots with the identified keyframes when the neighboring video shots are apparently related to a story represented by the identified keyframes;

(e) extracting the keywords from the text information and storing the keywords at locations associated with each node of the constructed FA model;

(f) analyzing and segmenting the audio signal of the multimedia signal into identified speaker segments, music segments, laughter segments, and silent segments (g) attaching the identified speaker segments, music segments, laughter segments, and silent segments to the constructed FA model;

(h) when the constructed FA model matches a previously defined FA model, storing the identity of the constructed FA model as the final FA model along with the keywords;

(i) when the constructed FA model does not match a previously defined FA model, generating a new FA model corresponding to the constructed FA model, storing the new FA model, and storing the identity of the new FA model as the final FA model along with the keywords;

(j) when the final FA model corresponds to a predetermined program category, performing video story segmentation according to the substeps of:

(j)(i) extracting a plurality of keywords from an input first sentence;

(j)(ii) categorizing the first sentence into one of a plurality of video story categories;

(j)(iii) determining whether a current video shot belongs to a previous video story category, a current video story category or a new video story category of the plurality of video story categories responsive to similarity between the first sentence and an immediately preceding sentence; and (j)(iv) repeating steps (j)(i) through (j)(iii) until all video clips and respective sentences are assigned to one of the video story categories.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 6A is a flowchart illustrating the steps employed in categorizing an incoming multimedia signal into a particular story category while

DETAILED DESCRIPTION OF THE PREFERRED EMBODIMENTS

In video retrieval applications, the users normally desire to see one or more informative video clips regarding subjects of particular interest to the user without, for example, having the user play or replay the entire news program. Moreover, it would be advantageous if the user could select a video or other multimedia presentation, e.g., a movie, without requiring the user to know any additional information about the movie, e.g., title, gleaned from another source, e.g., a newspaper.

Figure 1:
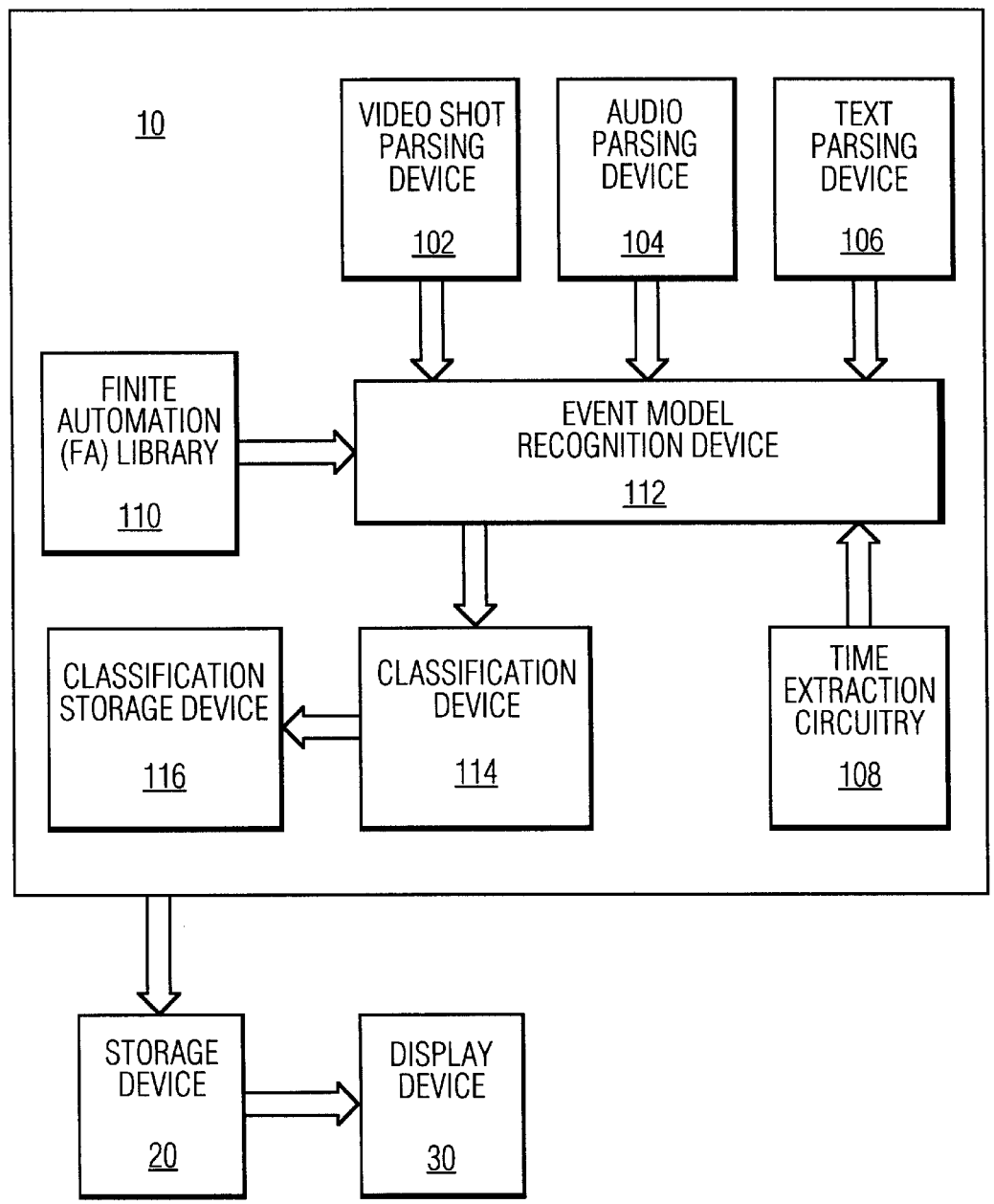
FIG. 1 is a high level block diagram of a multimedia computer system capable of story segmentation and information extraction according to the present invention.
Figure 2:
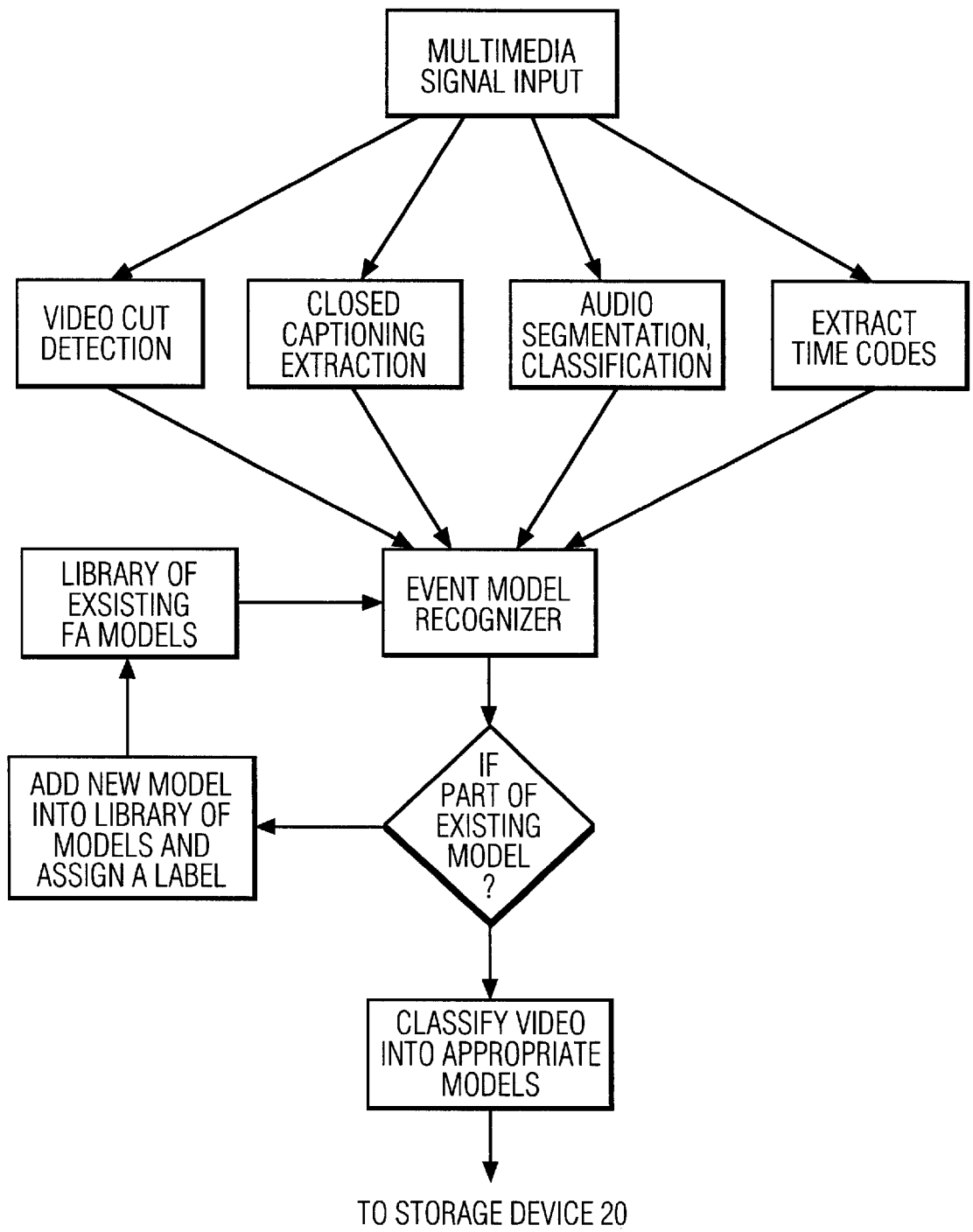
FIG. 2 is an illustrative diagram depicting the sequential and parallel processing modules found in an exemplary multimedia parser included in the multimedia computer system illustrated in FIG. 1.

A multimedia computer system according to the present invention is illustrated in block diagram form in FIG. 1, wherein a story segmentation device 10 receiving a multimedia signal, e.g., a broadcast television signal, is operatively connected to a storage device 20 and a display device 30. In an exemplary case, the device 10 advantageously can be a modified set top box used to connect a television 30 to the Internet while the storage device can be a video cassette recorder (VCR). Of course, other configurations are possible. For example, the multimedia computer system advantageously can be a multimedia-capable computer equipped with a television tuner card and a rewrittable compact disc (CD-RW) drive. In that case, the combination of the tuner card and the computer's central processing unit (CPU) would collectively constitute the story segmentation device 10, the rewrittable CD-RW would function as the storage device and the computer display would function as the display device. Alternatively, one of a compact disc read-only memory (CD-ROM) drive, a CD-RW drive, or a digital versatile disc (DVD) drive disposed in or adjacent to the multimedia computer system advantageously could be the source of the multimedia signal while the storage device could be, for example, the computer's hard drive. Other configurations, e.g., a configuration wherein the story segmentation device is built into the VCR or CD-RW drive, will readily suggest themselves to one of ordinary skill in the art and all such alternative configurations are considered to be with the scope of the present invention.

It should be mentioned at this point that the term multimedia signal is being used to signify a signal having a video component and at least one other component, e.g., an audio component. It will be appreciated that the terminology multimedia signal encompasses video clips, video stream, video bitstream, video sequence, digital video signal, broadcast television signal, etc., whether compressed or not. It should also be mentioned that the methods and corresponding systems discussed immediately below are preferentially in the digital regime. Thus, the broadcast video signal form of the multimedia signal, for example, is understood to be a digital signal, although the transmitted signal does not have to be in digitized signal.

It will be appreciated that the term "video signal" advantageously can be interchanged with multimedia signal. In either case, the term denotes an input signal which includes a time sequence of video shots, a time sequence of audio segments, and a time sequence of text, e.g., closed captioning. It will be appreciated that the video signal can either include time markers or can accept time markers inserted by, for example, the receiving component, i.e., video story segmentation device 10.

In the multimedia computer system illustrated in FIG. 1, the video story segmentation device 10 advantageously includes a video shot parsing device 102, an audio parsing device 104, a text parsing device 106, time extraction circuitry 108, a finite automaton (FA) library 110, an event model recognition device 112, a classification device 114, and classification storage device 116. It will be appreciated that the FA library 110 and the classification storage device advantageously can be formed from a single memory device, e.g., a nonvolatile memory such as hard drive, flash memory, programable read-only memory (PROM), etc. It should also be mentioned here, but discussed in greater detail below, that the "devices" included in the video story segmentation device 10 advantageously can be software modules for transforming a general purpose computer into a multimedia computer system, where each of the modules resides in a program memory, i.e., a storage media, until called for by the system's CPU. A detailed description of the various devices included in the video story segmentation device 10 will now be provided in terms of the corresponding software modules.

The video signal, which advantageously can be a broadcast television signal, is applied to the video story segmentation device 10 and separated into its component parts in a known manner, e.g., by applying the video signal to a bank of appropriate filters.

The multimedia signal video story segmentation device advantageously implements an analysis method consisting of a variety of algorithms for integrating information from various sources, wherein the algorithms include text retrieval and discourse analysis algorithms, a video cut detection algorithm, an image retrieval algorithm, and a speech analysis, e.g., voice recognition, algorithm. Preferably, the video story segmentation device includes a closed caption decoder capable to inserting time stamps; a video cut detection device which produces a sequence of key frames and time stamps for these key frames; a speech recognition system which can detect and identify speakers as well as separate the audio signal into other discrete segment types, e.g., music, laughter and silent segments.

Figure 3A:
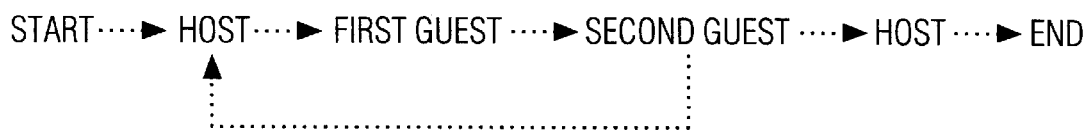
FIGS. 3A and 3B are diagrams which are useful in explaining the concept of a finite automaton (FA) associated with the present invention.
Figure 3B:
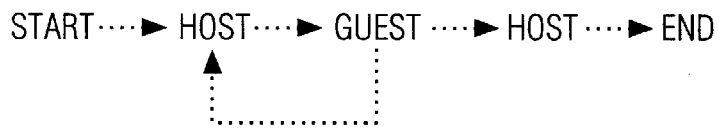

Referring to FIGS. 3A and 3B, the concept of finite automata (FA) as used in the instant application is similar to that used in compiler construction. A transition graph for the automaton is built when describing the finite automata (FA), which are used for recognizing a particular language. With respect to story segmentation and/or recognition, each node of the finite automaton (FA) represents an "event," where an event constitutes a symbolic label designating, for example, a set of keyframes, a set of keywords, or an audio feature designation. Each transition is based not only on the appearance of a particular symbol, but on a collection of symbols that represent text, video frame, and audio segments. FIGS. 3A and 3B illustrate different configurations of a FA model of a talk show class FA model.

A preferred embodiment of the present invention will now be described with reference to FIGS. 4A through 6, wherein FIGS. 4A–4D illustrate the identification of keyframes and their organization to diagram basic representations of dialogs, wherein FIGS. 5A–5E illustrate the integration of a dialog into a multimedia presentation, i.e., television show, and wherein FIG. 6 depicts an exemplary method for constructing a retrievable multimedia signal.

Figure 4A:
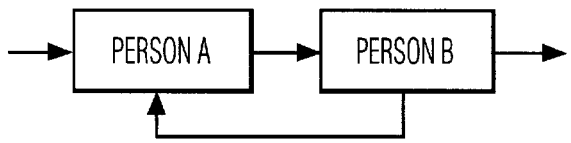
FIGS. 4A–4D are schematic diagrams illustrating various video segment sequences processed by the video parser portion of the multimedia story segmentation process according to the present invention.
Figure 4B:
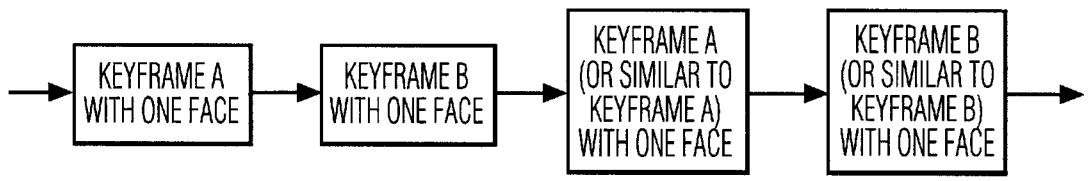
Figure 4C:
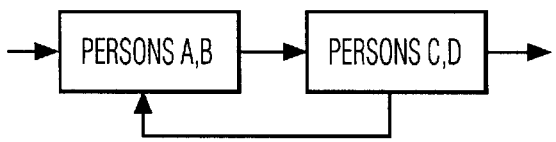
Figure 4D:
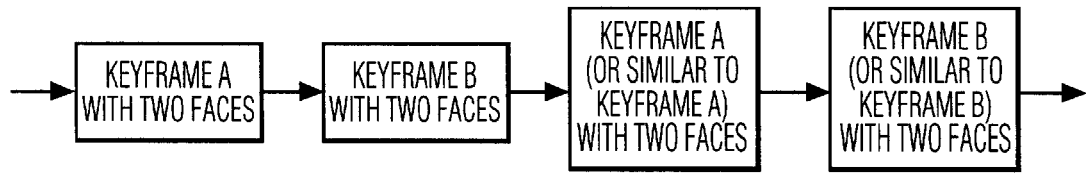

Referring specifically to FIG. 6, the method of multimedia signal story segmentation start at step 10 with analyzing the video portion of the received multimedia signal to identify keyframes therein. It will be appreciated that keyframes are those frames which are clearly not transitions; preferably keyframes contain identifiable subject matter, e.g., head shots of individuals. During step 12, the identified keyframes within the video shot sequence are compared with predetermined FA characteristics to identify a pattern of appearance within the video shot sequence. For example, FIGS. 4A–4D illustrate various patterns having a characteristic dialog pattern. In particular, FIG. 4A illustrates the keyframes associated with a basic dialog wherein a first speaker is followed by a second speaker. FIG. 4B illustrates the keyframe sequence wherein the first and second speakers alternately speak. A more complex dialog pattern is illustrated in FIGS. 4C and 4D. In FIG. 4C, several pairs of potential speakers are shown, with the second pair following the first pair of speakers. It will be appreciated that the keyframe sequence is the same whether both members of the first speaker pair talk or only one member of the first speaker pair talks. It will also be appreciated that FIG. 4D illustrates the keyframe sequence wherein the pairs of speakers alternate with one another. It should be noted that there are several classes of multimedia signal sequences which include a dialog sequence, as will be discussed further with respect to FIGS. 5A–5E.

Figure 6A:
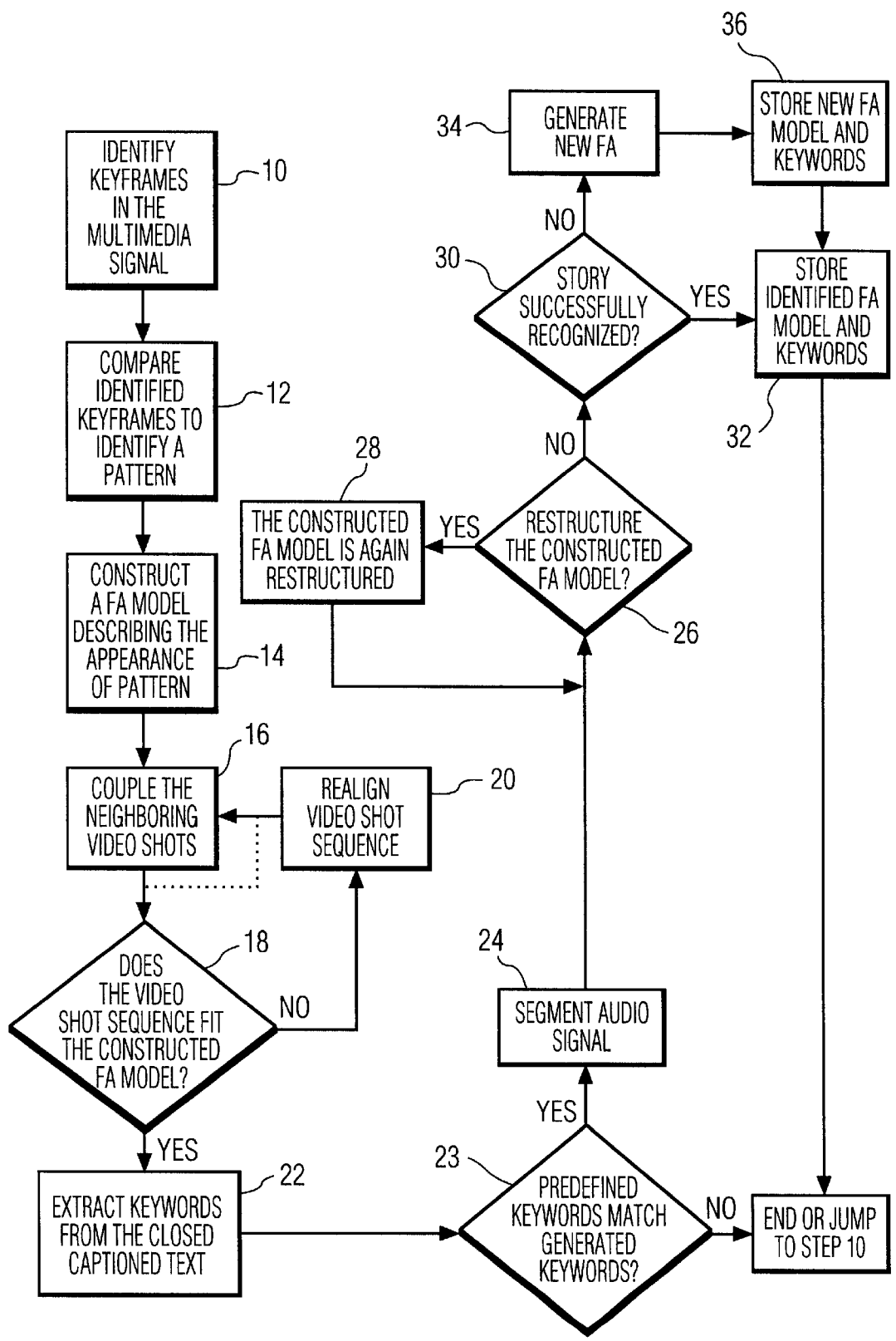

The video shot sequence is also examined for other characteristic patterns such as news programing and action, during step 12 of FIG. 6A. During step 14, an FA model is constructed describing the appearance of the video shot sequence.

During step 16, the neighboring video shots or similar shots are coupled with the keyframes if these neighboring video shots appear to be related to the story represented by the keyframes. It should be mentioned that step 16 is facilitated by substeps 16a and 16b, which permit retrieval of textual information, e.g., closed captioning, from the multimedia signal and discourse analysis of the retrieved text, respectively. During step 18, a check is performed to determine whether the video shot sequence fits the constructed FA. If the answer is affirmative, the program jumps to step 22; when the answer is negative, the video shot sequence is realigned during step 20 and step 16 is repeated. Alternatively, steps 20 and 18 can be performed seriatim until the determination at step 18 becomes affirmative. During step 22, keywords are extracted from the text associated with each node for later use during program retrieval.

Figure 9:
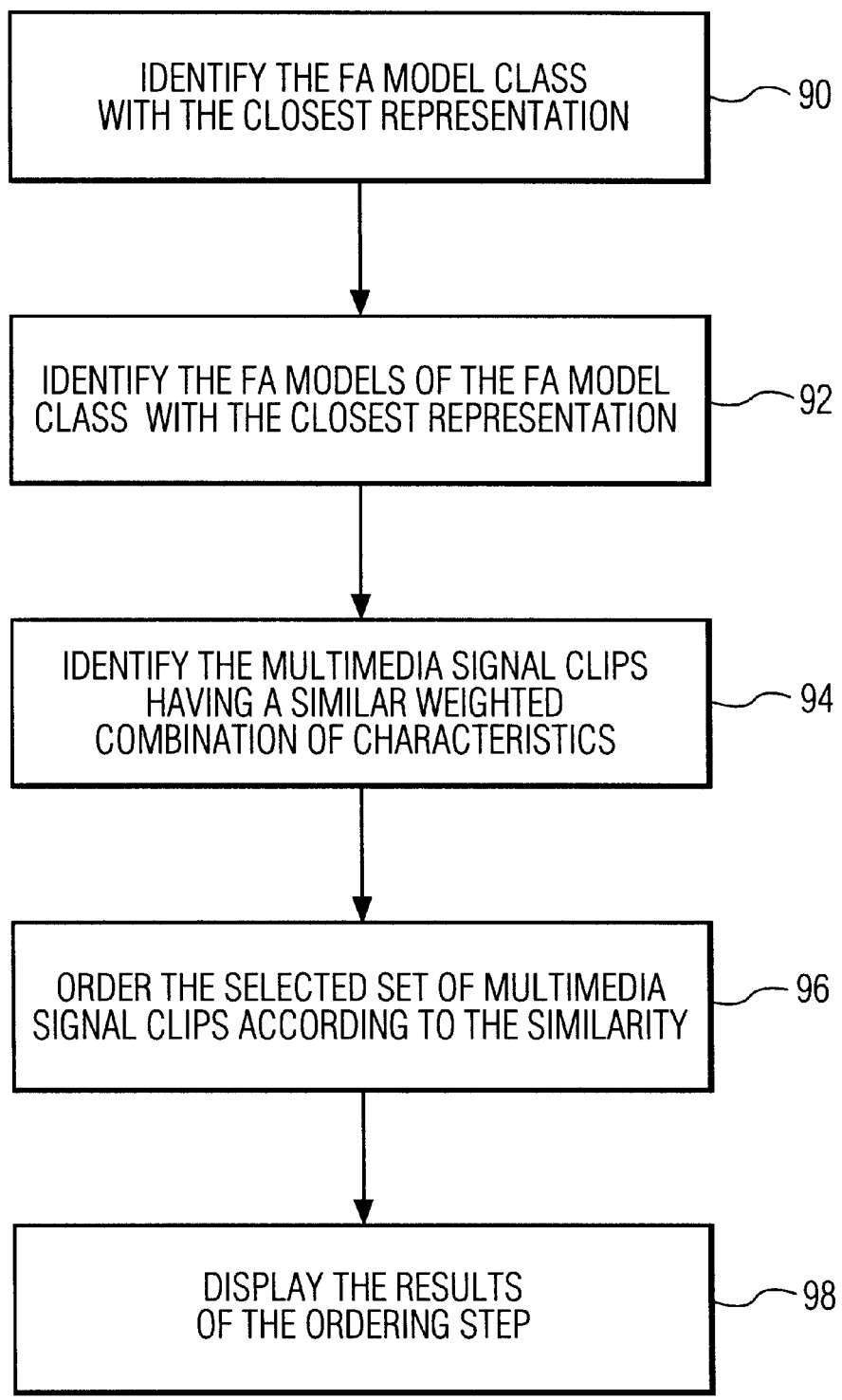
FIG. 9 is a flowchart illustrating the steps performed in retrieving story segments matching selected, user defined criteria.

The discussion up to this point has assumed that the multimedia signal applied to the device 10 will be stored for possible later retrieval, as discussed with respect to FIG. 9. However, the method also accommodates preselected multimedia signal storage by modifying the method following step 22. For example, during a step 23, a check advantageously could be performed to determine whether the keywords generated in step 22 match predetermined keywords selected by the user before the multimedia signal parsing method was initiated. When the answer is affirmative, the program proceeds to step 24; when the answer is negative, the parsing results predicted to date are discarded and the program either returns to the start of step 10 or ends.

Figure 5A:
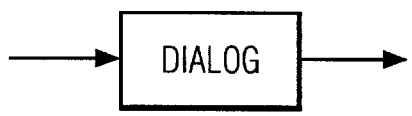
FIG. 5A–5E are schematic diagrams illustrating various audio and/or text segment sequences processed by the speech recognition and closed caption processing portions of the multimedia story segmentation process according to the present invention.
Figure 5B:
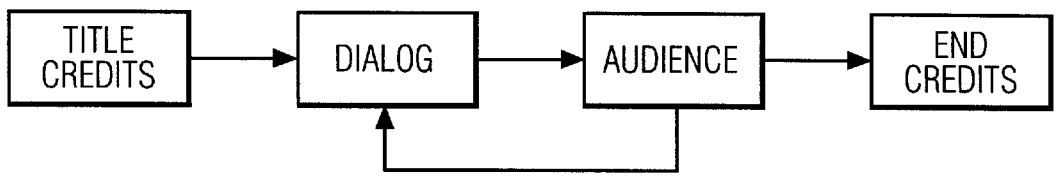
Figure 5C:
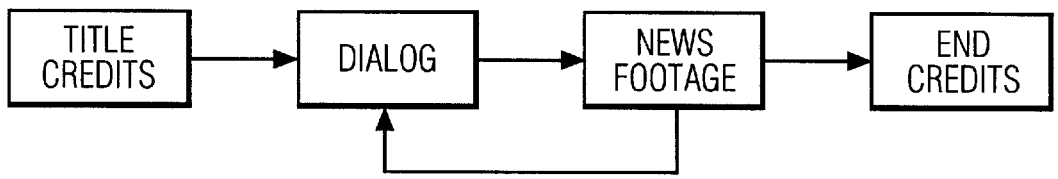
Figure 5D:
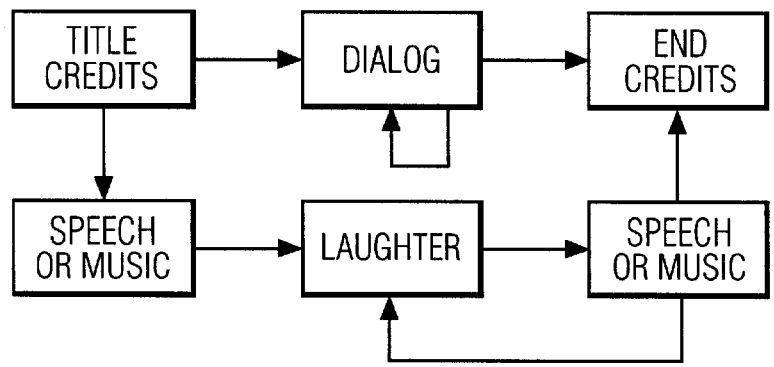
Figure 5E:
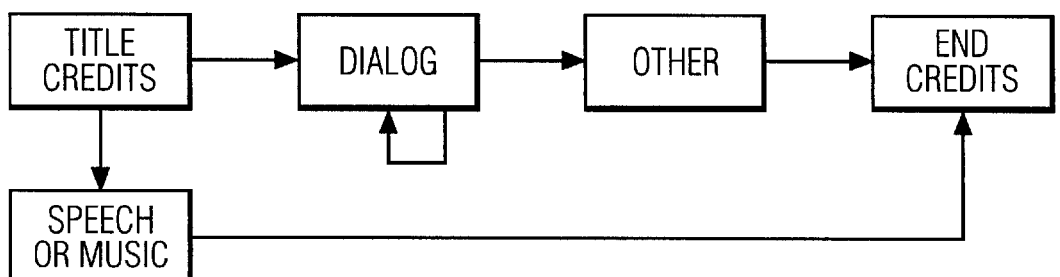

During step 24, the multimedia signal parser analyzes the audio track(s) in the multimedia signal to identify speakers, the presence of music, the presence of laughter, and periods of silence and segments the audio track(s) as required. During step 26, the a check is performed to determine whether it is necessary to restructure the FA model to accommodate the audio segments. If the answer is negative, the program jumps to step 30; when the answer is affirmative, the FA model is again restructured during step 28 and step 26 is repeated. The overall results are illustrated in FIGS. 5A–5E. As previously mentioned, the basic dialog FA model, which is depicted in FIG. 5A, can be part of a larger, more complex FA model. FIG. 5B illustrates an exemplary FA model of a talk show while FIG. 5C illustrates an exemplary news program. Furthermore, FIG. 5D illustrates a typical situation comedy (sitcom) while FIG. 5E illustrates a movie. Although not previously mentioned, it will be appreciated that the program's duration can be used to assist in multimedia signal parsing, e.g., when the program duration is two hours or more, the multimedia signal parsing method preferably will not attempt to match the story segments with, for example, the FA model of a new program.

During step 30, a check is performed to determine whether a story has been successfully "recognized" by the video signal parser. An affirmative answer to this check signifies that the set of consecutive video shots and associated audio segments have the sequential structure corresponding to the operation of a predefined finite automaton (FA). Thus, when the answer is affirmative, the identity of the FA and the keywords describing the FA characteristics are stored in classification storage device 116 in step 32. When the answer is negative, the multimedia signal parser constructs a new FA during step 34 and stores the new FA in FA library 110 during step 36 and then stores the FA identity and keywords in classification storage device 116 during step 32. It will be appreciated that the label assigned the FA model generated in step 34 advantageously can be assigned by the user, can be generated by the multimedia computer system using electronic programming guide (EPG) information, or can be generated by the multimedia computer system using a random label generator.

The FA models illustrated in FIGS. 5A–5E describe events in particular categories of TV 10 programs. It will be appreciated that the terminology TV program is not to be taken as a limitation on the preferred embodiments of the present invention; this terminology is meant to encompass broadcast television, specialized pointcast bitstreams from the Internet, video conference calls, video depositions, etc. These FA models are used for parsing input multimedia programs, e.g., television programs with closed captioning, and classifying these multimedia programs into predefined category according to the closest model. It will also be appreciated that the features used during multimedia signal parsing advantageously can be used later for program retrieval.

It should be mentioned that for recognizing "person X," the multimedia signal parser has to first apply a skin or flesh tone detection algorithm to detect the presence of one image region with skin color in a keyframe to, for example, permit later retrieval of keyframes including flesh tone image portions, and then to apply a face detection algorithm to identify a specific person. It will also be appreciated that dialogs can be between different numbers of people. When keyframes are used for identification of dialogs, then the skin detection algorithm mentioned above should be used to identify the presence and number of people in the keyframes. Alternatively, the multimedia signal parser can be equipped with speaker identification algorithm to facilitate detection of two or more alternating speakers.

Stated another way, the story segmentation process according to the present invention implements a multi-pass multimedia signal parser, which categorizes video and audio segments into the known classes of multimedia stories, e.g., simple dialog, talk show, news program, etc. When the multimedia signal clip does not conform to one of the known classes, the multimedia signal parser advantageously builds a new finite automaton, i.e., starts a new class. This multimedia signal parsing method according to the present invention advantageously can be used for representation and categorization of multimedia clips, since multimedia clips with similar structure will have the same FA model.

Figure 6B:
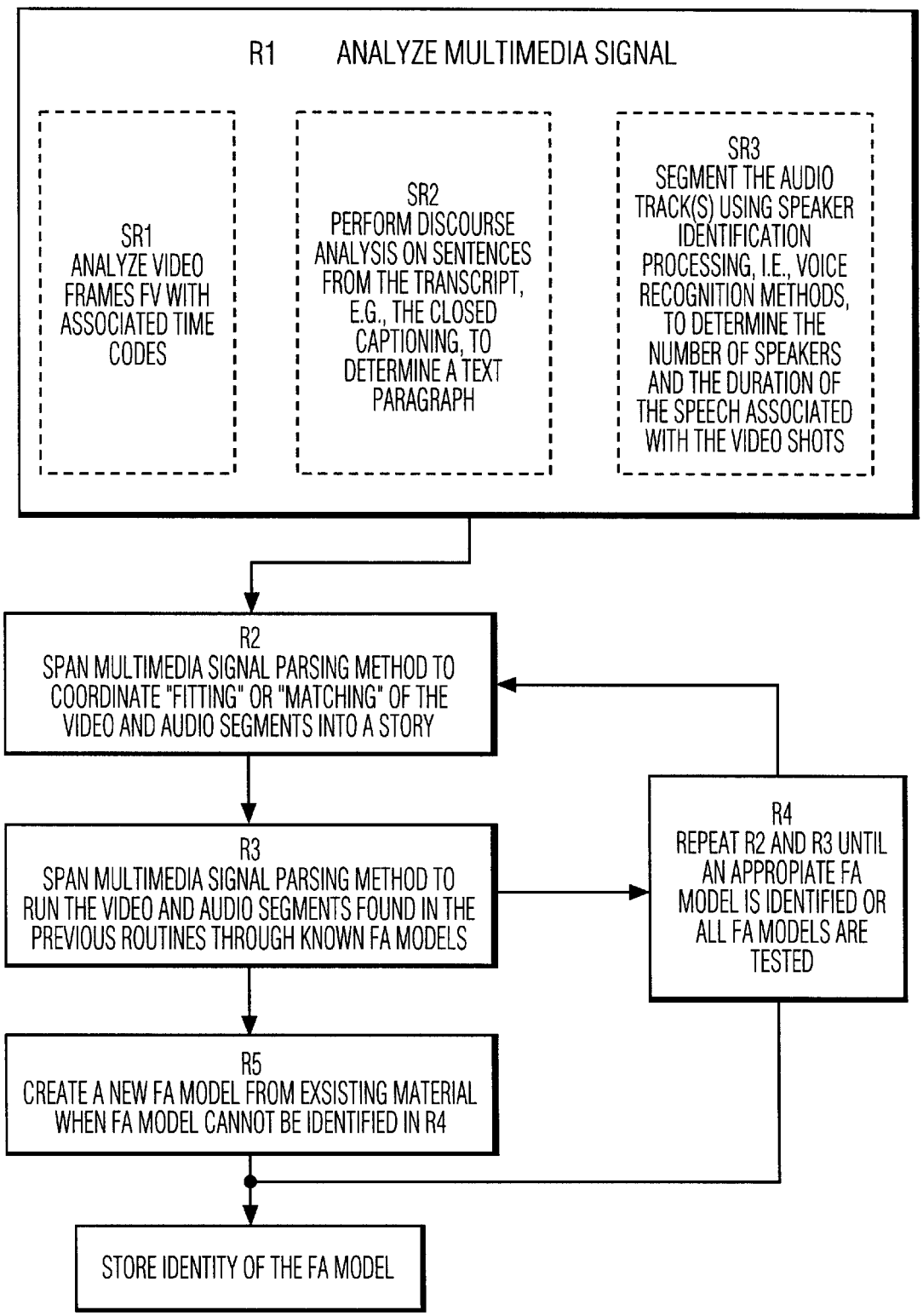
FIG. 6B is a flowchart illustrating various routines forming an alternative method for categorizing the incoming multimedia signal into a particular story category.

Thus, an alternative multimedia signal parsing method according to the present invention includes first through fifth routines, as illustrated in FIG. 6B. During the first routine R1, the multimedia signal, which preferably includes a set of video shots S, several subroutines are executed in parallel. In particular, the video frames Fv with associated time codes are analyzed during SR1, while sentences from the transcript, e.g., the closed captioning, is read sequentially so as to, using discourse analysis, determine a text paragraph during SR2. Moreover, the audio track(a) are segmented using speaker identification processing, i.e., voice recognition methods, to determine the number of speakers and the duration of the speech associated with the video shots during SR3. It will be appreciated that performance of SR2 will be facilitated when the closed captioning includes a periodic time stamp.

During routine R2, the multimedia signal parsing method is spanned to coordinate the "fitting" or "matching" of the video and audio segments into a story. See M. Yeung et al., "Video Content Characterization for Digital Library Application," Proceeding of the SPIE on Storage and Retrieval for Images and Video Databases V, pages 45–58 (Feb. 1997), which article is incorporated by reference for all purposes. It will be appreciated that this routine will emulate the work of the FA. During routine R3, the multimedia signal parsing method is again spanned to run the video and audio segments found in the previous routines through known finite automaton (FA) models. Then, routine R4 repeats routines R2 and R3 until an appropriate FA model from the set of known FA models is identified. If, however, an appropriate, i.e., close, FA model cannot be identified after a predetermined passed though the R2–R4 routine loop, the multimedia signal parsing method then creates a new FA model from existing material during routine R5. Whether the FA model was previously known or newly generated, the method ends a routing R6, wherein the identity of the FA model is stored.

From the detailed discussion above, it will be appreciated that the method illustrated in, for example, FIG. 6A is primarily employed in order to determine the classification or categorization of the video signal, i.e., to distinguish a sitcom from a news program. It will also be appreciated that once the categorization method of FIG. 6A has been completed, programs categorized as, for example, news programs or talk shows, should be subjected to at least one additional pass so as to segment each program into its constituent video stories. Thus, the video story parsing method and corresponding device advantageously are employed once the multimedia computer system has determined that the program consists of a news program or a talk show. The individual stories within the program are detected and, for each story, the multimedia computer system generates and stores a story identification (ID) number, the input video sequence name, e.g., a file name, the start and end times of the video story, all of the keywords extracted from transcribed text, e.g., closed captioning, corresponding to the video story, and all the keyframes corresponding to the video story.

Figure 7:
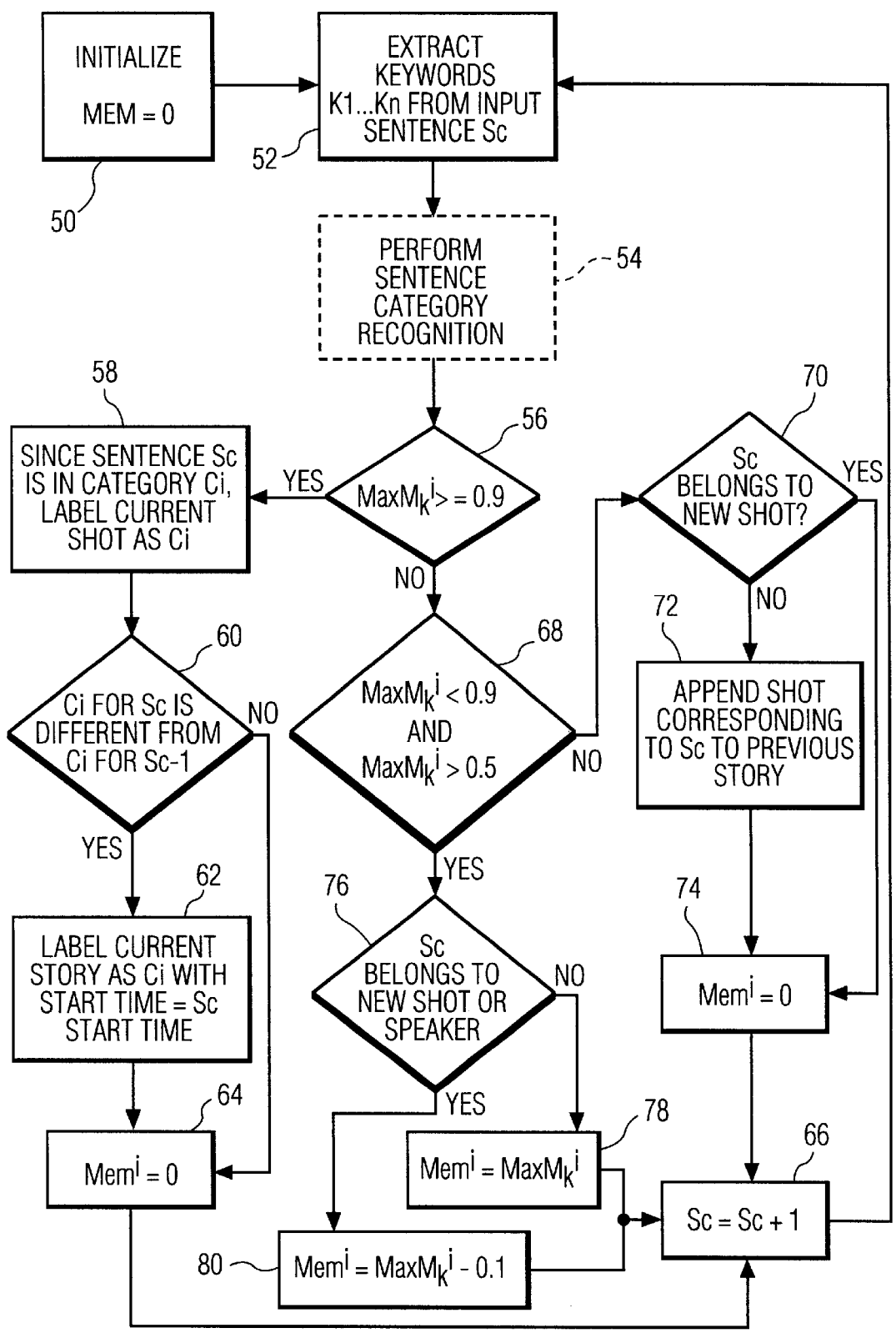
FIG. 7 is a high level flowchart depicting an exemplary method for parsing predetermined story types according to a preferred embodiment of the present invention.
Figure 8:
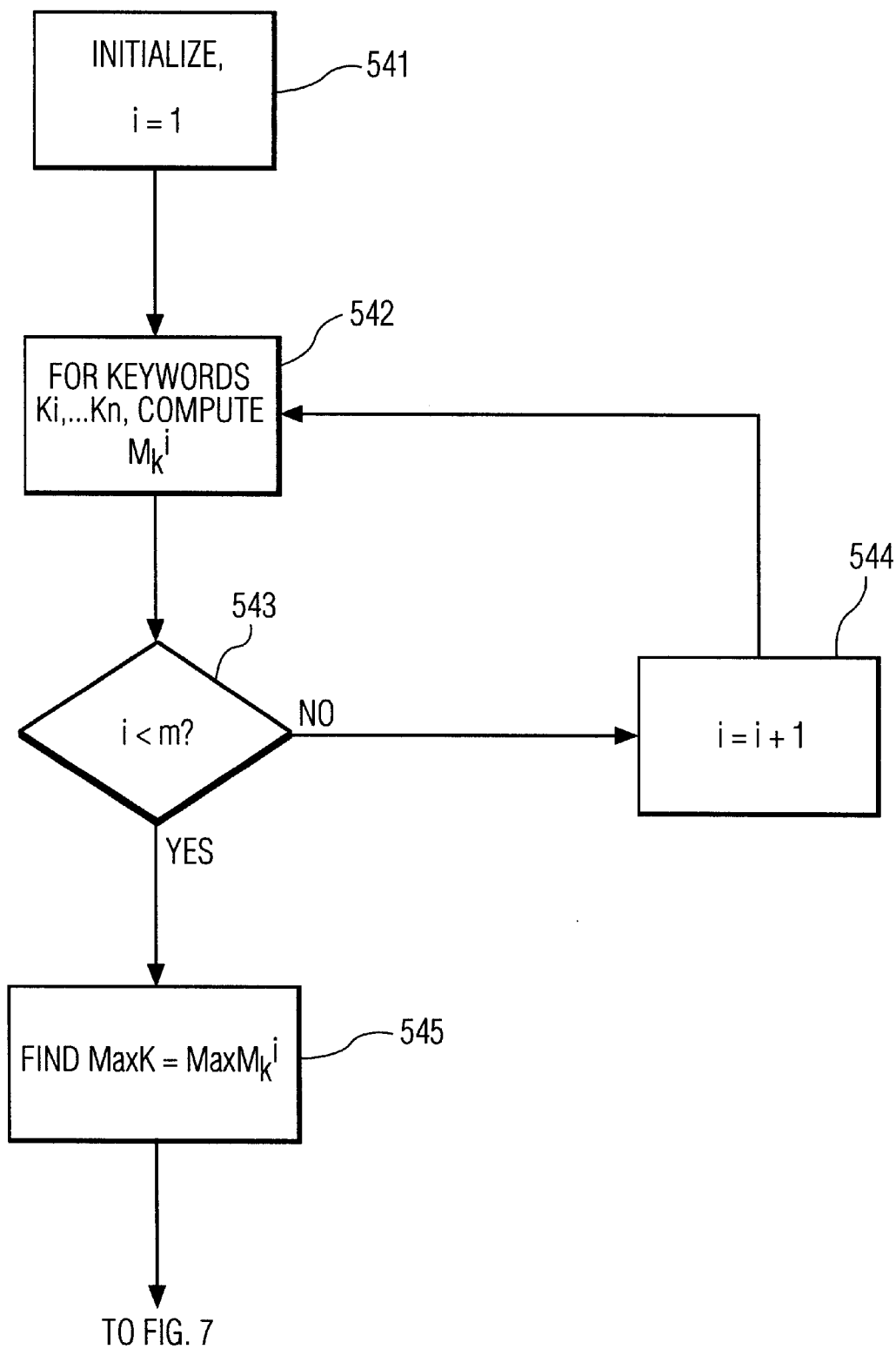
FIG. 8 is a low level flowchart illustrating a preferred embodiment of one of the steps depicted in FIG. 7.

A detailed discussion of a preferred embodiment of the video story parsing method according to the present invention will now be presented with respect to FIGS. 7 and 8. It should be mentioned that the method illustrated in FIGS. 7 and 8 generally utilize the same program modules as employed in performance of the method shown in FIG. 6 and discussed above. It will also be appreciated that before the method of FIG. 7 is performed, a number of categories C1, . . . , Cm, have been identified and tagged with representative keywords. Moreover, transcribed text either extracted from the closed captioning or generated by a voice recognition program module, and with time stamps indicative of the start of a sentence Sc, is available. In addition, the output video shots and time stamps are available from the video shot parsing device 102 of FIG. 1.

During step 50, the video story parsing method according to the present invention is initialized. In particular, variables are set to their initial values, e.g., $Mem^i=0$ for all "i" from 1 to m. During step 52, keywords K1, . . . , Kn are extracted from an input sentence Sc. Then, during step 54, sentence category recognition is performed on sentence Sc. Preferably, the method illustrated in FIG. 8 can be employed in performing step 54, as discussed in detail immediately below. It should be mentioned that m and n designate positive integers.

During step 541, the subroutine illustrated in FIG. 8 is initialized; in particular, a marker value "i" is initialized, i.e., set equal to 1. Subsequently during step 542, a measure $M_k^i$ of the similarity between the keywords extracted during step 52 and the keywords for the ith story category Ci is determined. In an exemplary case, $M_k^i$ is determined according to the expression set:

$$M_k^i = \left(\frac{MK}{Nkeywords} + Mem^i\right)/2$$

$$M_k^i = \frac{MK}{Nkeywords}$$

where MK denotes the number of matched words out of the total number, i.e., Nkeywords, of keywords for the sentence in the category Ci. It will be appreciated that the value $Mem^i$ is indicative of a measure of similarity with respect to the previous sentence sequence within the same category Ci. It should be noted that the value $M_k^i$ defined to be less than 1 in all cases.

During step 543, a check is performed to determine whether all defined categories m have been tested. In the answer is affirmnative, the subroutine jumps to step 545; when negative, the value of "i" is incremented by 1 during step 544 and step 542 is repeated using with respect to the next category Ci+1. When step 545 is finally performed, the maximum value MaxK is determined from all values of $M_k^i$, i.e., $MaxK=maxM_k^i$. After step 545 is performed, the generated value MaxK is tested during steps 56 and 68, which two steps permit the determination of the category Ci to which the sentence Sc belongs.

More specifically, during step 56, a check is performed to determine whether max $M_k^i$, i.e., MaxK, is $\geq 0.9$. When the check is affirmative, the sentence Sc has been determined to belong to the category Ci and the current video shot is labeled as belonging to category Ci. Thereafter, a step 60 is performed to determine whether the category Ci for the current sentence is different from the category to which sentence Sc-1 belongs. When the answer is affirmative, the current story is labeled as belonging to the category Ci and the video story start time is set to the start time of the sentence Sc. When the answer is negative or after step 62 has been performed, the value of $Mem^i$ is reset, the term Sc is incremented by 1, and keywords K1, . . . , Kn are extracted from the next sentence by repeating step 54.

Referring again to step 56, when the determination at step 56 is negative, a further check is performed to determine which of two ranges the value $maxM_k^i$ belongs to at step 68. If the answer is affirmative, a further check is performed to determine whether the sentence Sc is indicative of a new video shot or a new speaker. It will be appreciated that it can be determined whether the current shot is a new shot or not by comparing the time stamp generated by a cut detection algorithm, as discussed above, to the time of the current video shot. It will also be appreciated that the presence of a new speaker can be determined either by audio speaker identification or by keyframe comparison and flesh tone (skin detection) algorithms followed by employment of a face detection algorithm. When a new video shot or new speaker has been identified, the value $Mem^i$ is adjusted downward during step 80 and step 66 is again performed. When a new video shot or new speaker has not been identified, $Mem^i$ is set equal to $maxM_k^i$ and step 66 is again performed.

When the result of the determination performed at step 68 is negative, a test is performed to determine whether the sentence Sc belong to a new shot. When the answer is affirmative, the value $Mem^i$ is reset to 0 at step 74 and then step 66 is performed. However, when the answer at step 70 is negative, the current video shot is appended to the previous video story at step 72 and then step 74 is performed. As mentioned previously, step 66 follows step 74; thus, steps 54 through 66 are repeated until the entire program has been processed by the video story parsing method according to the present invention.

From the detailed discussion above, it will be appreciated that the method for retrieving a multimedia signal clip of interest consists of finding the FA representation of a multimedia signal clip with a predetermined structure and similar characteristics. The retrieval method, which is illustrated in FIG. 9, consists of steps for identifying the FA model class with the closest representation, i.e., closest structure (step 90), for identifying the FA models with the FA model class with the closest representation, i.e., closest structure (step 92), and, of those multimedia signal clips which have the most similar FA structure, find the most similar ones using a weighted combination of characteristic identified by the above-described analytical methods, i.e., based on text, i.e., topic of story, image retrieval characteristics such as color and or texture, similarity in the speaker's voice, motion detection, i.e., presence or absence of motion, etc. (step 94). The final steps of the retrieval process are to order the selected set of multimedia signal clips according to the similarity (step 96) and to display the results of the ordering step (step 98).

More specifically, in order to retrieve a video story, keyword retrieval, keyframe retrieval, or a combination of keyword-keyframe retrieval advantageously can be performed. Preferably, the previously determined keywords of all video stories are compared to the retrieval keywords and ranked using information retrieval techniques, e.g., $KW_1, \ldots, KW_n$.

When a known keyframe can be specified as the retrieval criteria, all of the extracted keyframes are compared with the given keyframe. Advantageously, the comparison is performed using content-based image retrieval. In particular, content-based image retrieval can be based on the number of people detected in the keyframe, overall similarity based on color histogram for the overall image, or using the method of keyframe similarity described in commonly assigned, co-pending U.S. patent application Ser. No. 08/867,140, which application was filed on Jun. 2, 1997, and which application is incorporated herein be reference for all purposes. For each video story, a determination advantageously can be made of the highest similarity between the input image and the keyframes representative of each respective one of the video stories. After performing such a comparison with respect to all video stories in the video story database and locating, in an exemplary case, r similar video stories, a similarity vector with values $\{KF_1, \ldots, KF_r\}$ can be constructed where the elements match the similarity value with the corresponding video story. The maximum over this vector advantageously can be determined by known algorithms. It will be appreciated that the corresponding index will specify the video story with the keyframe which is most similar to the imput image.

It should be mentioned that when both keywords and at least one image are used in initiating video story retrieval, a combined measure of similarity in the form $M=w_1KW+w_2KF$ can be computed for each video story and used to determine a maximum value over the video stories in the video story database. Moreover, keywords, keyframes and audio characteristics advantageously can be used in initiating video story retrieval using a combined measure of similarity calculated according to the expression $M=w_1KW+w_2KF+w_3KA$, where $w_3KA$ is a similarity value for audio content. It will be appreciated that the weights $w_1$, $w_2$ and $w_3$ advantageously can be specified by the user. It will also be appreciated that a number of similarity measures from information theory, e.g., the Kullback measure, advantageously can be used.

It should also be mentioned that a video clip itself advantageously can be used as the retrieval criteria. In that case, the video clip is first segmented using the video story parsing method, and the keywords and keyframes or images of the input video clip are employed as the retrieval criteria. These retrieval criteria are then compared with the keywords and keyframe associated with each video story in the video story database. Additionally, the video stories can be compared with the input video clip using speaker identification and other features, e.g., the number of speakers, the number of music segments, the presence of long silences, and / or the presence of laughter. It should be mentioned that music scoring algorithms for extracting note sequences in the audio track of the video signal advantageously can be used as a retrieval criteria, e.g., all video stories having selected notes of the "1812 Overture" can be retrieved.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A multimedia signal parsing method for operating a multimedia computer system receiving a multimedia signal including a video shot sequence, an associated audio signal and corresponding text information to permit story segmentation of the multimedia signal into discrete stories, each of which has associated therewith a final finite automaton (FA) model and keywords, at least one of which is associated with a respective node of the FA model, the method comprising steps for:

(a) analyzing the video portion of the received multimedia signal to identify keyframes therein to thereby generate identified keyframes;

(b) comparing said identified keyframes within the video shot sequence with predetermined FA characteristics to identify a pattern of appearance within the video shot sequence;

(c) constructing a finite automaton (FA) model describing the appearance of the video shot sequence to thereby generate a constructed FA model;

(d) coupling neighboring video shots or similar shots with said identified keyframes when said neighboring video shots are apparently related to a story represented by said identified keyframes;

(e) extracting said keywords from said text information and storing said keywords at locations associated with each node of said constructed FA model;

(f) analyzing and segmenting the audio signal of the multimedia signal into identified speaker segments, music segments, laughter segments, and silent segments (g) attaching said identified speaker segments, music segments, laughter segments, and silent segments to said constructed FA model;

(h) when said constructed FA model matches a previously defined FA model, storing the identity of said constructed FA model as said final FA model along with said keywords; and (i) when said constructed FA model does not match a previously defined FA model, generating a new FA model corresponding to said constructed FA model, storing said new FA model, and storing the identity of said new FA model as said final FA model along with said keywords.

2. The multimedia signal parsing method as recited in claim 1, wherein said step (d) further comprises:

(d) coupling neighboring video shots or similar shots with said identified keyframes when said neighboring video shots are apparently related to a story represented by said identified keyframes by:

(d)(i) retrieving of said text information from the multimedia signal; and (d)(ii) performing discourse analysis of the retrieved text information so as to generate indicia used in coupling said neighboring video shots.

3. The multimedia signal parsing method as recited in claim 1, wherein said method further comprises:

(j) when it is determined that said video shot sequence does not fit the constructed FA model, realigning said video shot sequence, wherein said step (j) is performed prior to performing said step (f).

4. The multimedia signal parsing method as recited in claim 1, further comprising steps for:
- (k) determining whether it is necessary to restructure the constructed FA model to accommodate said identified speaker segments, music segments, and silent segments; and
- (l) when restructuring is necessary, restructure the constructed FA model;

wherein said steps (k) and (l) are performed prior to performing said steps (h) and(i).

5. The multimedia signal parsing method as recited in claim 1, further comprising steps for:
- (m) determining whether said keywords generated in step (e) match user-selected keywords selected; and
- (n) when a match is not detected, terminating the multimedia signal parsing method.

6. A combination receiving a multimedia signal including a video shot sequence, an audio signal and text information for parsing the multimedia signal into one of a plurality of story program categories, each of the program categories having an associated finite automaton (FA) model and keywords, at least one of which keywords being associated with a respective node of the FA model, comprising:
- first means for analyzing the video portion of the received multimedia signal to identify keyframes therein to thereby generate identified keyframes;
- second means for comparing said identified keyframes within the video shot sequence with predetermined FA characteristics to identify a pattern of appearance within the video shot sequence;
- third means constructing a finite automaton (FA) model describing the appearance of the video shot sequence to thereby generate a constructed FA model;
- fourth means for coupling neighboring video shots or similar shots with said identified keyframes when said neighboring video shots are apparently related to a story represented by said identified keyframes;
- fifth means for extracting said keywords from said text information and storing said keywords at locations associated with each node of said constructed FA model;
- sixth means for analyzing and segmenting the audio signal in the multimedia signal into identified speaker segments, music segments, and silent segments
- seventh means for attaching said identified speaker segments, music segments, and silent segments to said constructed FA model;
- eighth means for storing the identity of said constructed FA model as said final FA model along with said keywords when said constructed FA model matches a previously defined FA model; and
- ninth means for generating a new FA model corresponding to said constructed FA model, for storing said new FA model, and for storing the identity of said new FA model as said final FA model along with said keywords when said constructed FA model does not match a previously defined FA model.

7. The combination as recited in claim 6, further comprising:
- fourth means for coupling neighboring video shots or similar shots with said identified keyframes when said neighboring video shots are apparently related to a story represented by said identified keyframes by employing tenth means for retrieving of said text information from the multimedia signal; and eleventh means for performing discourse analysis of the retrieved text information so as to generate indicia used in coupling said neighboring video shots.

8. The combination as recited in claim 6, further comprising:
- twelfth means for, when it is determined that said video shot sequence does not fit the constructed FA model, realigning said video shot sequence,
- wherein said twelfth means is operatively coupled between said fifth means and said sixth means.

9. The combination as recited in claim 6, further comprising:
- fourteenth means for determining whether it is necessary to restructure the constructed FA model to accommodate said identified speaker segments, music segments, and silent segments; and
- fifteenth means for, when restructuring is necessary, restructuring the constructed FA model;
- wherein said fourteenth and fifteen means are serially coupled to one another and operatively coupled between said eight and ninth means.

10. The combination as recited in claim 6, further comprising:
- sixteenth means for determining whether said keywords generated by said fifth means match user-selected keywords selected; and
- seventeenth means for, when a match is not detected, terminating operation of the combination.

11. The method as recited in claim 6, further comprising:
- eighteenth means for extracting a plurality of keywords from an input first sentence;
- nineteenth means for categorizing said first sentence into one of a plurality of video story categories;
- twentieth means for determining whether a current video shot belongs to a previous video story category, a current video story category or a new video story category of said plurality of video story categories responsive to similarity between said first sentence and an immediately preceding sentence; and
- twenty-first means for operating said eighteenth through twentieth means seriatim until all video clips and respective sentences are assigned to one of said categories,
- wherein said eighteenth through twentieth means are serially coupled to both said eighth means and said ninth means, and
- wherein said eighteenth through twenty-first means are operative when said identified FA model corresponds to a predetermined one of the program categories.

12. A video story parsing method employed in the operation of a multimedia computer system receiving a multimedia signal including a video shot sequence, an associated audio signal and corresponding text information to permit a multimedia signal parsed into a predetermined category having an associated finite automaton (FA) model and keywords, at least one of the keywords being associated with a respective node of the FA model to be parsed into a number of discrete video stories, the method comprising steps for:
- (a) extracting a plurality of keywords from an input first sentence;
- (b) categorizing said first sentence into one of a plurality of categories;

(c) determining whether a current video shot belongs to a previous category, a current category or a new category of said plurality of categories responsive to similarity between said first sentence and an immediately preceding sentence;

(d) repeating steps (a) through (c) until all video clips and respective sentences are assigned to one of said categories.

13. The video story parsing method as recited in 12, wherein said step (b) comprises:

(b) categorizing said first sentence into one of a plurality of categories by determining a measure $M_k^i$ of the similarity between the keywords extracted during step (a) and a keyword set for an $i^{th}$ story category Ci according to the expression set:

if Mem$^i$ 0, $$M_k^i = \left(\frac{MK}{Nkeywords} + Mem^i\right)/2$$

if Mem$^i$=0, $$M_k^i = \frac{MK}{Nkeywords}$$

where MK denotes a number of matched words out of a total number Nkeywords of keywords in the respective keyword set for a characteristic sentence in said category Ci, where Mem$^i$ is indicative of a measure of similarity with respect to the previous sentence sequence within category Ci and wherein $0 \leq M_k^i < 1$.

14. A method for operating a multimedia computer system receiving a multimedia signal including a video shot sequence, an associated audio signal and corresponding text information to thereby generate a video story database including a plurality of discrete stories searchable by one of finite automaton (FA) model having associated keywords, at least one of which keywords is associated with a respective node of the FA model, and user selected similarity criteria, the method comprising steps for:

(a) analyzing the video portion of the received multimedia signal to identify keyframes therein to thereby generate identified keyframes;

(b) comparing said identified keyframes within the video shot sequence with predetermined FA characteristics to identify a pattern of appearance within the video shot sequence;

(c) constructing a finite automaton (FA) model describing the appearance of the video shot sequence to thereby generate a constructed FA model;

(d) coupling neighboring video shots or similar shots with said identified keyframes when said neighboring video shots are apparently related to a story represented by said identified keyframes;

(e) extracting said keywords from said text information and storing said keywords at locations associated with each node of said constructed FA model;

(f) analyzing and segmenting the audio signal of the multimedia signal into identified speaker segments, music segments, laughter segments, and silent segments (g) attaching said identified speaker segments, music segments, laughter segments, and silent segments to said constructed FA model;

(h) when said constructed FA model matches a previously defined FA model, storing the identity of said constructed FA model as said final FA model along with said keywords;

(i) when said constructed FA model does not match a previously defined FA model, generating a new FA model corresponding to said constructed FA model, storing said new FA model, and storing the identity of said new FA model as said final FA model along with said keywords;

(j) when said final FA model corresponds to a predetermined program category, performing video story segmentation according to the substeps of:

(j)(i) extracting a plurality of keywords from an input first sentence;

(j)(ii) categorizing said first sentence into one of a plurality of video story categories;

(j)(iii) determining whether a current video shot belongs to a previous video story category, a current video story category or a new video story category of said plurality of video story categories responsive to similarity between said first sentence and an immediately preceding sentence; and (j)(iv) repeating steps (j)(i) through (j)(iii) until all video clips and respective sentences are assigned to one of said video story categories.

15. The method as recited in 14, wherein said substep (j)(ii) further comprises:

(j)(ii) categorizing said first sentence into one of a plurality of sentence categories by determining a measure $M_k^i$ of the similarity between the keywords extracted during step (k)(i) and a keyword set for an $i^{th}$ video story category Ci according to the expression set:

if Mem$^i$ 0, $$M_k^i = \left(\frac{MK}{Nkeywords} + Mem^i\right)/2$$

if Mem$^i$=0, $$M_k^i = \frac{MK}{Nkeywords}$$

where MK denotes a number of matched words out of a total number Nkeywords of keywords in the respective keyword set for a characteristic sentence in said category Ci, where Mem$^i$ is indicative of a measure of similarity with respect to the previous sentence sequence within category Ci and wherein $0 \leq M_k^i < 1$.

16. The method as recited in claim 14, wherein said step (d) further comprises:

(d) coupling neighboring video shots or similar shots with said identified keyframes when said neighboring video shots are apparently related to a story represented by said identified keyframes by:

(d)(i) retrieving of said text information from the multimedia signal; and (d)(ii) performing discourse analysis of the retrieved text information so as to generate indicia used in coupling said neighboring video shots.

17. The method as recited in claim 14, wherein said method further comprises:

(k) when it is determined that said video shot sequence does not fit the constructed FA model, realigning said video shot sequence, wherein said step (k) is performed prior to performing said step (f).

18. The multimedia signal parsing method as recited in claim 14, further comprising steps for:
  (l) determining whether it is necessary to restructure the constructed FA model to accommodate said identified speaker segments, music segments, and silent segments; and
  (m) when restructuring is necessary, restructure the constructed FA model;

wherein said steps (l) and (m) are performed prior to performing said steps (h) and (i).

19. The method as recited in claim 14, further comprising steps for:
  (n) determining whether said keywords generated in step (e) match user-selected keywords selected; and
  (o) when a match is not detected, terminating the multimedia signal parsing method.

* * * * *